(12) United States Patent
Liu

(10) Patent No.: US 8,373,448 B2
(45) Date of Patent: Feb. 12, 2013

(54) ELECTRONIC LOAD OF SEMICONDUCTOR ELEMENT

(75) Inventor: Ying-Chang Liu, Taipei County (TW)

(73) Assignee: Prodigit Electronics Co., Ltd., Taipei County (TW)

( * ) Notice: Subject to any disclaimer, the term of this patent is extended or adjusted under 35 U.S.C. 154(b) by 0 days.

(21) Appl. No.: 13/159,643

(22) Filed: Jun. 14, 2011

(65) Prior Publication Data

US 2012/0086475 A1    Apr. 12, 2012

(30) Foreign Application Priority Data

Oct. 11, 2010    (TW) ................................ 99134582 A

(51) Int. Cl.
*H03L 5/00*    (2006.01)
*H03K 5/01*    (2006.01)
*H05B 37/02*    (2006.01)

(52) U.S. Cl. ........ 327/100; 327/108; 327/109; 327/131; 327/134; 327/170; 315/224; 315/291; 315/300; 315/307; 315/308

(58) Field of Classification Search .................. 315/224, 315/291, 300, 307, 308; 327/100, 108, 109, 327/131, 134, 170
See application file for complete search history.

(56) References Cited

U.S. PATENT DOCUMENTS

| | | | | |
|---|---|---|---|---|
| 2,683,850 A | * | 7/1954 | Weber et al. | 322/100 |
| 3,813,561 A | * | 5/1974 | Williams et al. | 327/109 |
| 4,050,309 A | * | 9/1977 | Junkert et al. | 374/171 |
| 5,034,896 A | * | 7/1991 | Orgun et al. | 701/124 |
| 5,113,158 A | * | 5/1992 | Tsuji et al. | 332/109 |
| 7,439,687 B2 | * | 10/2008 | Matsui et al. | 315/300 |
| 2007/0200591 A1 | * | 8/2007 | Kim | 326/30 |

* cited by examiner

*Primary Examiner* — Douglas W Owens
*Assistant Examiner* — Thai Pham
(74) *Attorney, Agent, or Firm* — Rosenberg, Klein & Lee

(57) ABSTRACT

An electronic load for a semiconductor element is provided. The electronic load includes at least two slope generating circuits, each of which generates a current according to a current for the electronic load corresponding to an output voltage of a power supply. Each slope generating circuit comprises at least a first slope generating circuit that simulates a first slope when the output voltage of the power supply is between 0V to a rated voltage, and a second slope generating circuit that simulates a second slope when the output voltage of the power supply is higher than the conducting state voltage of the semiconductor element by subtracting the forward bias voltage from the output voltage of the power supply.

4 Claims, 5 Drawing Sheets

ELECTRONIC LOAD OF SEMICONDUCTOR ELEMENT

BACKGROUND OF THE INVENTION

1. Field of the Invention

The invention relates to an electronic load apparatus, and more particularly to an electronic load for simulating electrical characteristics of a semiconductor element by utilizing at two slope generating circuits.

2. Description of the Related Art

An electronic load apparatus is a fundamental and crucial equipment in a development and manufacturing of a power supply device. The electronic load apparatus is capable of replacing any circuit combinations of resistors and batteries to simulate a load at an output of a power supply device, so as to be applied in related research and development, quality control and production tests.

Electronic loads of different operating modes including constant current mode, constant voltage mode, constant power mode and constant resistance mode have been provided by the prior art with respect to resistance, battery and circuit aspects. However, due to electrical characteristics of semiconductor elements that have a conducting state voltage, the above conventional electronic loads are inappropriate for simulations of semiconductor elements.

Taking a light-emitting diode (LED) for example, the LED is inactive when a voltage fed to the LED is smaller than a predetermined conducting state voltage, and it only becomes active (i.e., lit up) when the voltage fed to the LED is greater than the conducting state voltage. In current simulations of electrical characteristics of LEDs, a simple constant resistance mode is generally utilized in simulating an LED. As stated previously, not only the conventional electronic load operating at a constant resistance mode but also the conventional electronic load operating at a constant current mode, a constant voltage mode and a constant power mode are incapable of accurately achieving simulations of electrical characteristics of LEDs.

Another conventional electronic load for simulating an LED with respect to characteristics of the LED is also proposed. Although this conventional electronic load also simulates with a resistance mode, a non-linear voltage applied to the LED is directly deducted before proceeding to the resistance operating mode. The reason for such measure is that an important electrical characteristic of semiconductor elements is in fact purposely neglected, meaning that inaccurate results are rendered by this conventional electronic load. Yet, under precision demands of semiconductor elements, this conventional electronic load fails to meet manufacturer requirements.

SUMMARY OF THE INVENTION

The invention is directed to an electronic load for simulating electrical characteristics of a semiconductor element made of a semiconductor material with respect to a power supply. According to characteristic curves of different semiconductor elements applied, a plurality of slopes are utilized to depict characteristic curves of a semiconductor element.

According to another aspect of the present invention, a simulated electronic load apparatus for an LED is provided for simulating electrical characteristics of an LED. According to a characteristic curve of a semiconductor LED, a plurality of slopes are utilized to depict characteristic curves of a semiconductor LED.

Compared to the prior art, an electronic load apparatus capable of accurately simulating electrical characteristics of a semiconductor element is provided. Since overall electrical characteristics of a semiconductor element are taken into consideration, the electronic load apparatus of the present invention offering optimal simulation accuracy is especially suitable for semiconductors requiring high precisions, and more particularly suitable for simulating electrical characteristics of LEDs.

An electronic load apparatus of the present invention comprises at least two slope generating circuits. Each of the at least two slope generating circuits is predetermined with different voltage-to-current slopes, and generates a current for the electronic load corresponding to an output voltage of the power supply according to the output voltage of the power supply. Each of the slope generating circuits comprises: at least one first slope generating circuit for simulating a first slope according to a first slope when the output voltage of the power supply ranges between 0V to a rated voltage; and a second slope generating circuit for simulating a second slope by subtracting a forward bias voltage from the output voltage of the power supply when the output voltage of the power supply is greater than a conducting state voltage of the semiconductor element. The semiconductor element is particularly suitable for a semiconductor LED.

In a preferred embodiment of the present invention, the first slope generating circuit comprises a first multiplier, which has its first end connected to the power supply for receiving the output voltage of the power supply and its second input end connected to a predetermined first resistance parameter setting value. The second slope generating circuit comprises: a subtractor, having its first input end connected to the power supply for receiving the output voltage of the power supply, its second input end connect to a conducting state voltage corresponding to the semiconductor element, and its output end for outputting a voltage difference value obtained by subtracting the conducting state voltage of the semiconductor element from the output voltage of the power supply; and a multiplier, having its first input end connected to the output end of the subtractor to receive the voltage difference value, and its second input end connected to a predetermined second resistance parameter setting value.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figures 1, 2:
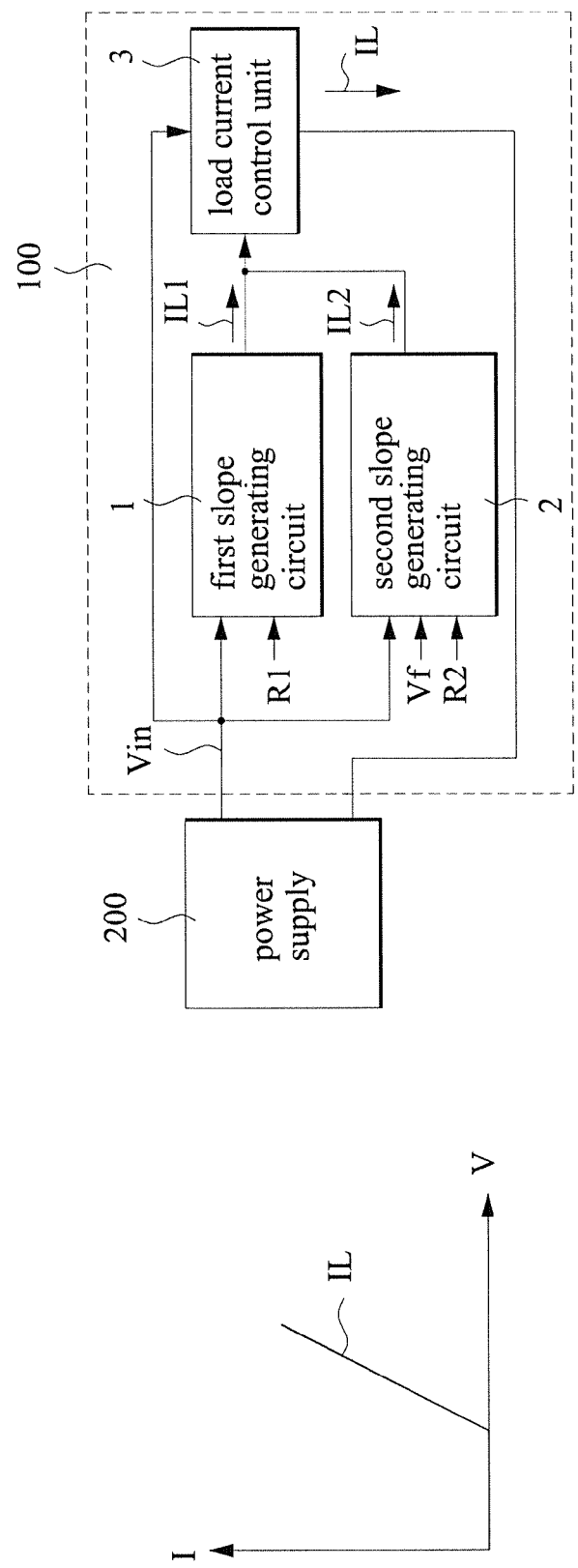
FIG. 1 is a voltage-to-current electrical characteristic curve of a prior electronic load for a semiconductor LED.
FIG. 2 is a block diagram of an electronic load for a semiconductor element of the present invention.

Referring to FIG. 2, an electronic load 100 is connected to a power supply 200 providing a voltage Vin to simulate an electrical characteristic curve of a semiconductor element. In this embodiment, a semiconductor LED is used as an example but not to be construed as limiting the present invention. To achieve simulation of the semiconductor LED, a plurality of slopes are used to construct the characteristic curve of the semiconductor LED.

The electronic load 100 according to the embodiment of the invention comprises at least two slope generating circuits. Each of the slope generating circuit is given different predetermined voltage-to-current slopes, and generates a load current of the electronic load 100 corresponding to the voltage Vin of the power supply 200.

As shown in FIG. 2, the electronic load 100 comprises a first slope generating circuit 1, a second slope generating circuit 2, and a load current control unit 3. The first slope generating circuit 1 has its input end connected to the power supply 200 and its output end connected to the load current control unit 3. The first slope generating circuit 1 comprises a first resistance parameter setting value R1. The first resistance parameter setting value R1 defines a first slope of voltage-to-current of the first slope generating circuit 1, and is determined according to a resistance value of the semiconductor LED.

The second slope generating circuit 2 has its input end connected to the power supply 200 and its output end connected to the load current control unit 3. The second slope generating circuit 2 comprises a second resistance parameter setting value R2. The second resistance parameter setting value R2 defines a second slope of voltage-to-current of the second slope generating circuit 2, and is determined according to a resistance value of the semiconductor LED. The second slope generating circuit 2 further comprises a conducting state voltage Vf of the semiconductor LED.

Figure 5:
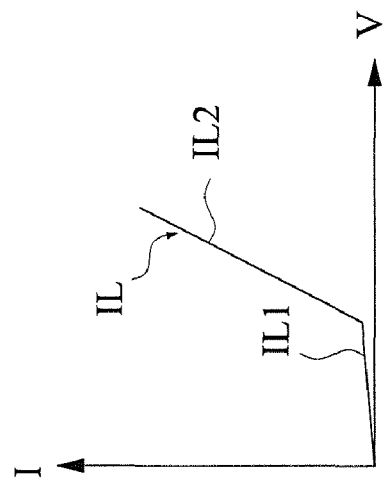
FIG. 5 is a voltage-to-current curve formed by combining the first current in FIG. 3 with the second current in FIG. 4 of the present invention.
Figure 4:
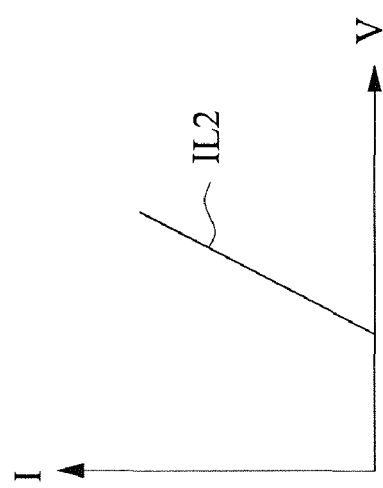
FIG. 4 is a voltage-to-current curve for a second current generated by a load current control unit triggered by a second slope generating circuit of the present invention.
Figure 3:
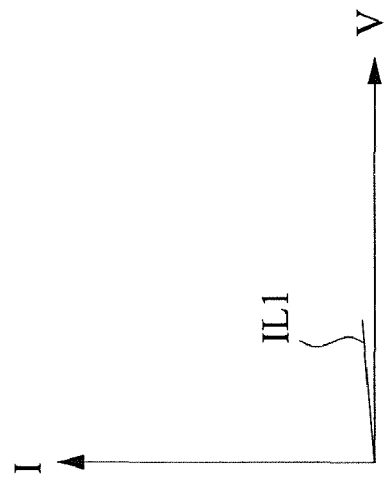
FIG. 3 is a voltage-to-current curve for a first current generated by a load current control unit triggered by a first slope generating circuit of the present invention.

With reference to FIGS. 3 to 5, according to the voltage Vin generated by the power supply 200, the first slope generating circuit 1 generates a first load current IL1 to simulate at least a first slope, so as to control the load current control unit 3 to generate a current IL of the electronic load 100 corresponding to the voltage Vin of the power supply 200, as shown in FIG. 3.

When the voltage Vin of the power supply 200 is higher than the conducting state voltage of the semiconductor LED, the second slope generating circuit 2 subtracts a forward bias voltage of the semiconductor LED from the voltage Vin of the power supply 200 to generate a second load current IL2, so as to control the load current control unit 3 to generate the current IL of the electronic load 100 corresponding to the voltage Vin of the power supply 200, as shown in FIG. 4.

With the first current IL1 generated by load current control unit 3 via the first slope generating circuit 1 according to the first slope, and a second current IL2 generated by the load current control unit 3 via the second slope generating circuit 2 according to the second slope, the electrical characteristic curve of the semiconductor LED is simulated, as shown in FIG. 5.

Figure 6:
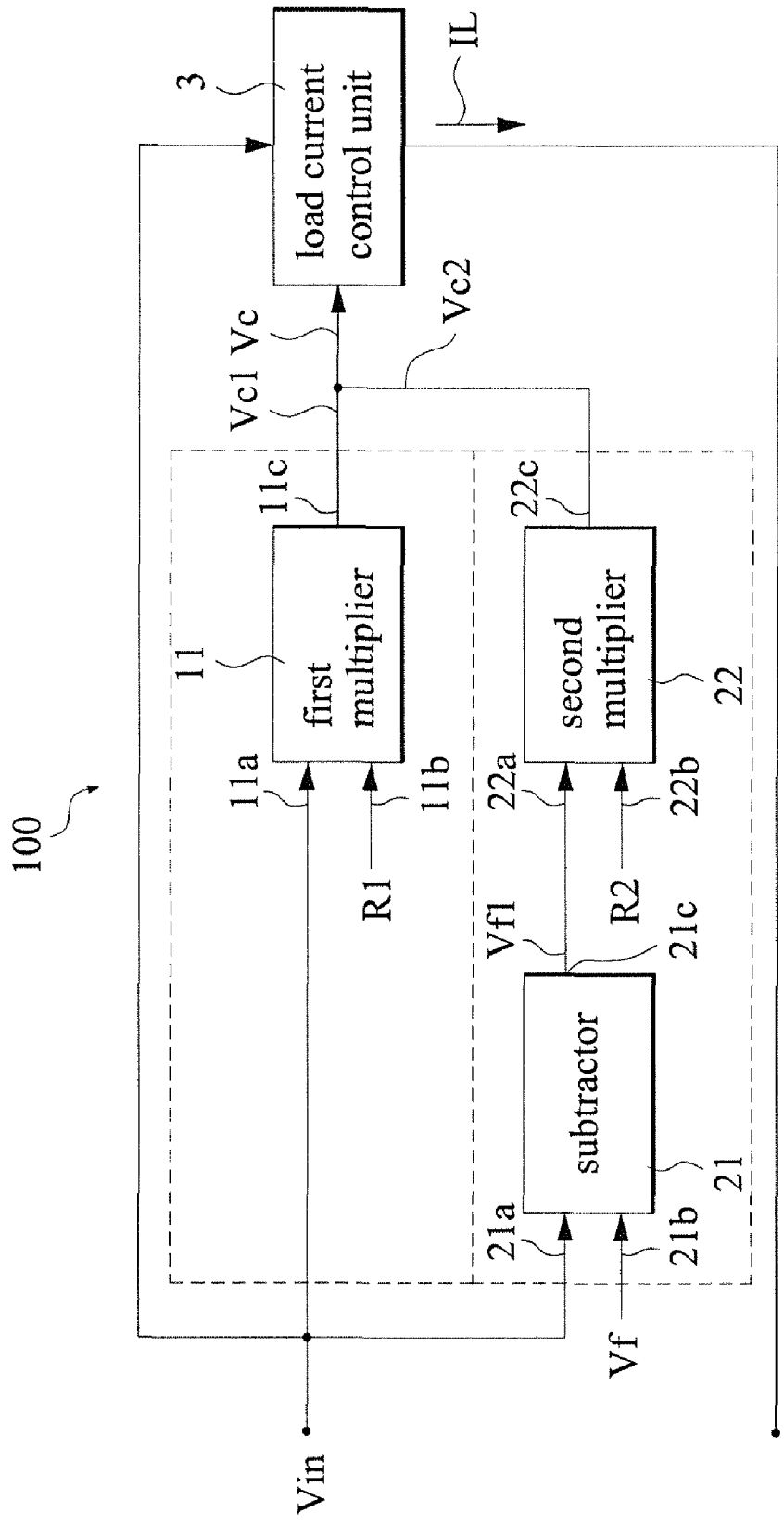
FIG. 6 is a schematic diagram of an electronic load in FIG. 2 according to an embodiment of the present invention.

FIG. 6 shows a schematic diagram of the electronic load 100 in FIG. 2. As shown, the first slope generating circuit 1 comprises a first multiplier 11. The first multiplier 11 has its first input end 11a connected to the power supply 200 to receive the voltage Vin of the power supply 200, its second input end 11b connected to a first resistance parameter setting value R1, and its output end 11c for outputting a voltage output value Vc1 obtained by multiplying the voltage Vin of the power supply 200 with the first resistance parameter setting value R1.

The second slope generating circuit 2 comprises a subtractor 21 and a second multiplier 22. The subtractor 21 has its first input end 21a connected to the power supply 200 to receive the voltage Vin of the power supply 200, its second input end connected to a conducting state voltage Vf corresponding to the semiconductor LED, and its output end 21c for outputting a voltage difference Vf1 obtained by subtracting the conducting state voltage Vf from the voltage Vin of the power supply 200. The second multiplier 22 has its first input end 22a connected to the output end 21c of the subtractor 21 to receive the voltage difference value Vf1, its second input end 22b connected to the second resistance parameter setting value R2, and its output end 22c for outputting a voltage output value Vc2 obtained by multiplying the voltage difference value Vf1 by the second resistance parameter setting value R2.

Figures 7, 8:
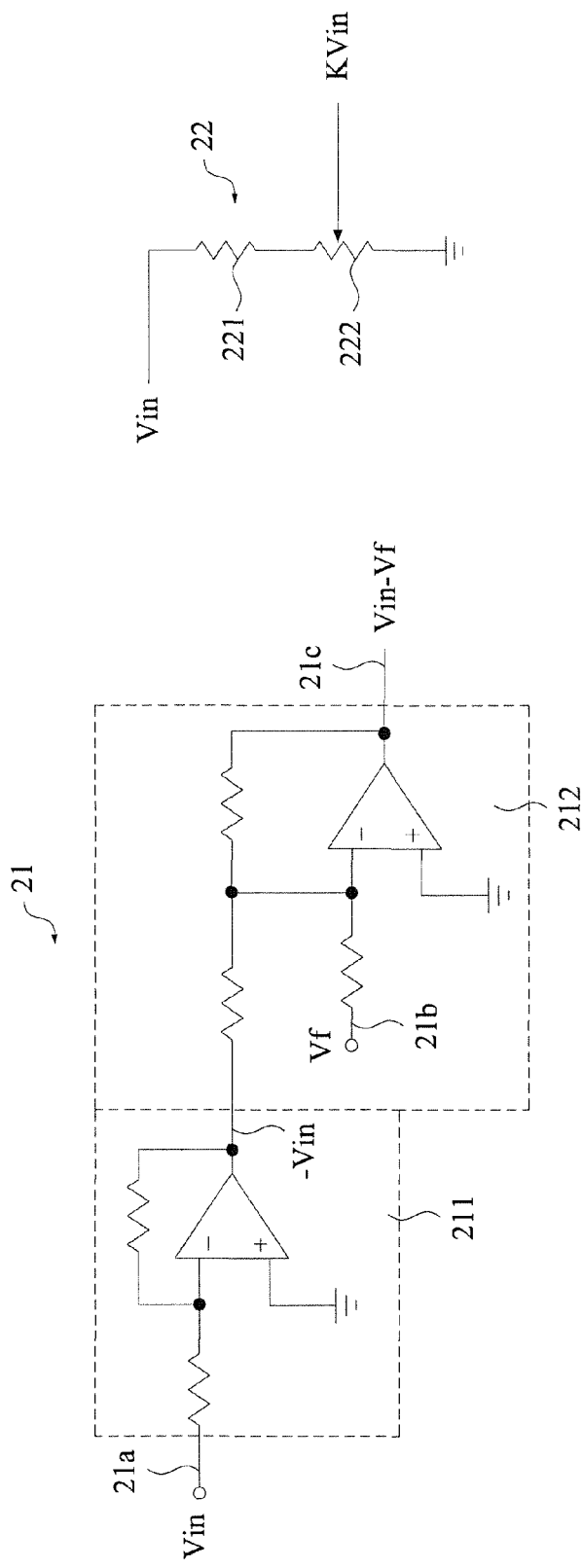
FIG. 7 is a circuit diagram of a subtractor in FIG. 6 according to an embodiment of the present invention.
FIG. 8 is a circuit diagram of a multiplier in FIG. 6 according to an embodiment of the present invention.

FIG. 7 shows a circuit diagram of the subtractor 21 in FIG. 6. In this embodiment, the subtractor 21 comprises an inverter circuit 211 and an adder circuit 212. The voltage Vin of the power supply 200 is inputted to an input end of the inverter circuit 211 to obtain a negative voltage −Vin, which is added to the conducting state voltage Vf by the adder circuit 212 to output a voltage Vin-Vf at the output end 21c of the subtractor 21 as the conducting state voltage of the semiconductor LED and also as a starting point of the second slope, and then the second multiplier 22 in FIG. 6 simulates the second slope from the starting point.

FIG. 8 shows a circuit diagram of the second multiplier 22 in FIG. 6. In this embodiment, the second multiplier 22 comprises a resistor 221 and a variable resistor 222 that together render functions of a multiplier. This circuit structure is also applicable to the multiplier 21 in FIG. 6.

Figure 9:
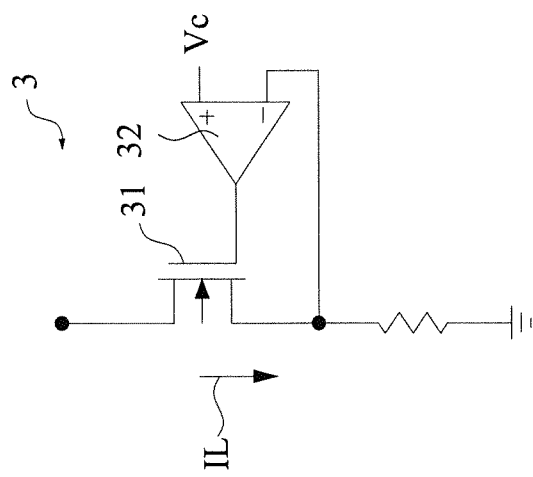
FIG. 9 is a circuit diagram of a load current control unit in FIG. 6 according to an embodiment of the invention.

FIG. 9 shows a circuit diagram of the load current control unit 3 according to an embodiment of the invention. In this embodiment, the load current control unit 3 comprises a switch unit 31, an operational amplifier 32 and related resistors. The magnitude of the current IL is determined by the magnitude of the voltage output value Vc.

Figure 10:
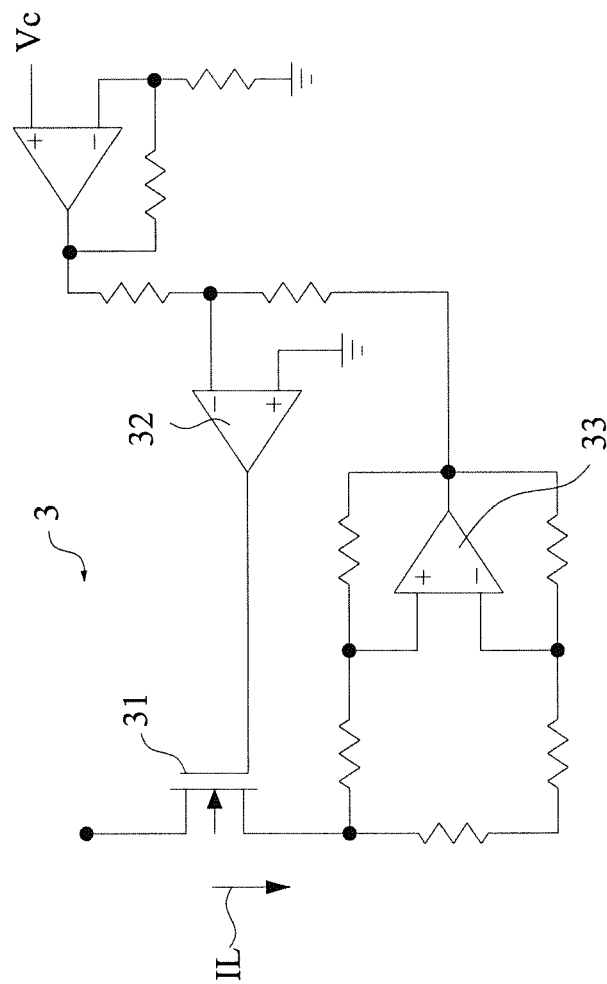
FIG. 10 is a circuit diagram of a load current control unit in FIG. 6 according to another embodiment of the invention.

FIG. 10 shows a circuit diagram of the load current control unit 3 according to another embodiment of the invention. In this embodiment, the load current control unit 3 comprises a switch unit 31, an operational amplifier 32, an operational amplifier 33, and related resistors. Similarly, the magnitude of the current IL is determined by the magnitude of the voltage output value Vc.

With the description of the above embodiments, it is apparent that a novel and practical electronic load for a semiconductor element is provided. While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electronic load for a semiconductor element, connected to a power supply, for simulating an electrical characteristic curve of the semiconductor element, the electronic load comprising:
   at least two slope generating circuits; wherein, each of the at least two slope generating circuits is predetermined with different voltage-to-current slopes, and generates a current for the electronic load corresponding to an output voltage of the power supply according to the output voltage of the power supply;
   each slope generating circuit comprises:
   at least one first slope generating circuit, for simulating a first slope according to a first slope when the output voltage of the power supply ranges between 0V to a rated voltage; and
   a second slope generating circuit, for simulating a second slope by subtracting a forward bias voltage from the output voltage of the power supply when the output voltage of the power supply is greater than a conducting state current of the semiconductor element;
   the first slope generating circuit comprises a first multiplier, which has a first end connected to the power supply for receiving the output voltage of the power supply and a second input end connected to a predetermined first resistance parameter setting value;
   the second slope generating circuit comprises:
   a subtractor, having a first input end connected to the power supply for receiving the output voltage of the power supply, a second input end connected to a conducting state voltage corresponding to the semiconductor element, and an output end for outputting a voltage difference value obtained by subtracting the conducting state voltage of the semiconductor element from the output voltage of the power supply; and
   a second multiplier, having a first input end connected to the output end of the subtractor to receive the voltage difference value, and a second input end connected to a predetermined second resistance parameter setting value.

2. The electronic load according to claim 1, wherein the semiconductor element is a semiconductor light-emitting diode (LED).

3. An electronic load for a semiconductor element, connected to a power supply, for simulating an electrical characteristic curve of the semiconductor element, the electronic load comprising:
   a load current control unit, connected to the power supply;
   a first multiplier, having its first end connected to the power supply for receiving the output voltage of the power supply and its second input end connected to a predetermined first resistance parameter setting value;
   a subtractor, having its first input end connected to the power supply for receiving the output voltage of the power supply, its second input end connect to a conducting state voltage corresponding to the semiconductor element, and its output end for outputting a voltage difference value obtained by subtracting the conducting state voltage of the semiconductor element from the output voltage of the power supply;
   a second multiplier, having its first input end connected to the output end of the subtractor to receive the voltage difference value, and its second input end connected to a predetermined second resistance parameter setting value;
   wherein, when the output voltage of the power supply ranges between 0V to a rated voltage, the first multiplier generates a first load current to control the load current control unit to generate a current of the electronic load corresponding to the output voltage of the power supply; and
   when the output voltage of the power supply is greater than a conducting state current of the semiconductor element, the second multiplier generates a second load current to control the load current control unit to generate a current of the electronic load corresponding to the output voltage of the power supply.

4. The electronic load according to claim 3, wherein the semiconductor element is a semiconductor LED.

* * * * *